March 27, 1934.  W. M. STRATFORD  1,952,898
TREATING HYDROCARBON OILS
Filed Sept. 25, 1930
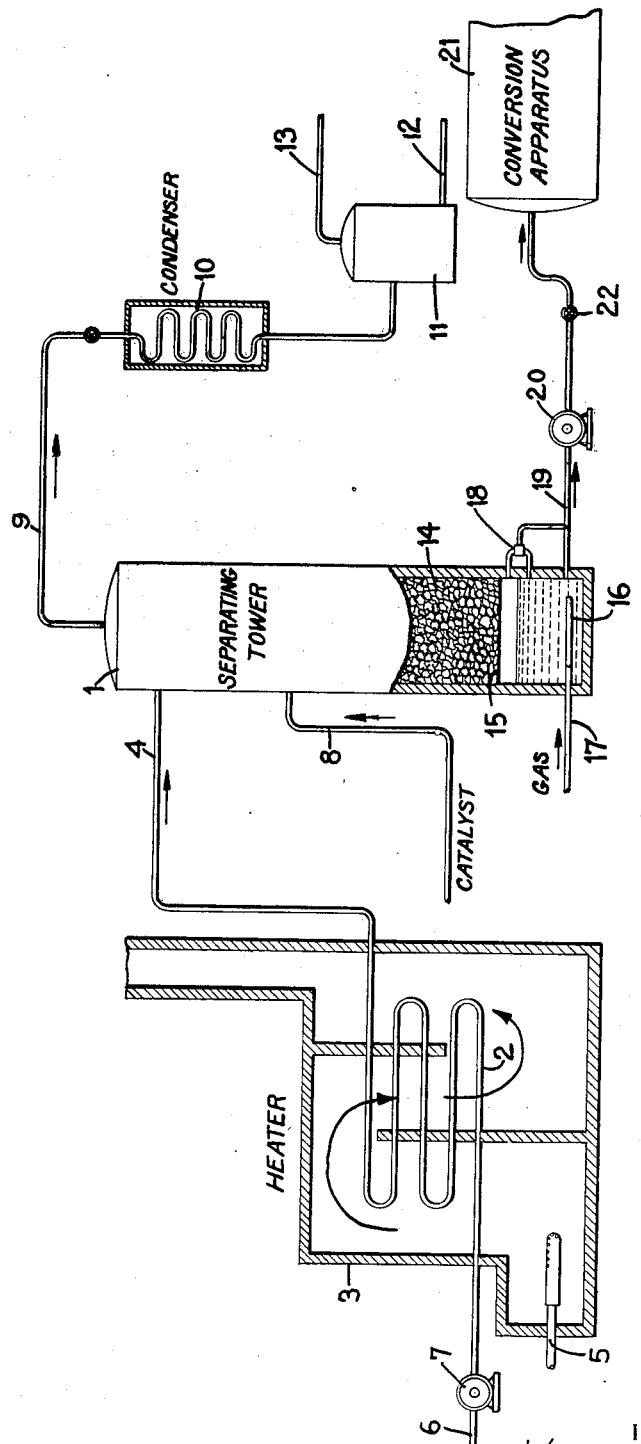
INVENTOR
W. M. Stratford
BY ATTORNEY
R. J. Dearborn Patented Mar. 27, 1934

1,952,898

UNITED STATES PATENT OFFICE 1,952,898

TREATING HYDROCARBON OILS

William Malcolm Stratford, New York, N. Y., assignor to The Texas Company, New York, N. Y., a corporation of Delaware Application September 25, 1930, Serial No. 484,338

2 Claims. (Cl. 196—54)

This invention relates to methods of treating hydrocarbon oil, and more particularly to methods of converting or otherwise treating hydrocarbon oil in the presence of a catalyst, whereby corrosion of the apparatus is substantially prevented.

The invention contemplates broadly a process of treating hydrocarbon oil so as to hydrogenate, or to convert higher boiling oil into lower boiling oil, which includes subjecting the oil to the action of a catalyst, for example anhydrous aluminum chloride, at elevated temperatures. In the process of the invention the catalyst is subjected to a preliminary treatment with hydrocarbon oil at temperatures slightly below those at which material conversion of the oil is likely to occur, whereby corrosive products of the reaction between the oil and catalyst are evolved, and are substantially eliminated from the mixture of catalyst and oil. Thereafter the oil and catalyst are subjected to elevated temperatures suitable for conversion, and if desired, to super-atmospheric pressure, whereby conversion, hydrogenation, or other modification of the oil may be accomplished without substantial evolution of corrosive materials and with consequent protection of the conversion apparatus from corrosion.

The prevention of corrosion and consequent depreciation of equipment used for converting oils is of considerable economical importance. This is especially true of conversion apparatus used in cracking or hydrogenating processes, which require equipment suitable to withstand high temperatures and pressures. Catalysts are often used in these types of apparatus and they sometimes constitute a source of severe corrosion. They often liberate very corrosive substances, such as acid fumes, which corrode various parts of the equipment and weaken the apparatus until it will no longer withstand the strain of the operating conditions imposed upon it. The liberation of corrosive substances from catalysts has been found to take place at comparatively low temperatures and during the initial stages of the reaction. For example, experiments have shown that aluminum chloride, when heated with oil, produces a liberal evolution of hydrochloric acid early in the heating and before conversion of the oil has taken place to any great extent. In a continuous process in which aluminum chloride is introduced into conversion apparatus, the corrosive hydrochloric acid is evolved near the point of entrance of the catalyst to the reaction zone, with the consequent failure of the apparatus at this point.

More particularly, in accordance with my invention, the evolution and removal of these corrosive materials are caused to take place in a zone separate from the conversion zone. This may be done under less severe conditions of temperature and pressure than those maintained in the conversion zone. It may, therefore, be carried out in apparatus that is less strong and expensive but nevertheless of selected materials which are resistant to the corrosive substances present.

The accompanying drawing is an elevation partly in section of a suitable apparatus for carrying out my process.

Referring to the drawing, the reference character 1 represents a separating tower for separating and removing the corrosive vapors and fumes which are liberated during the initial stages of the reaction of the catalyst with the oil. A heating coil 2, located within any heater 3, is connected to the tower 1 by a pipe 4. The heater is provided with a burner 5, adapted to supply heat to the coil 2. A pipe 6, in communication with a supply tank (not shown) is attached to the coil 2. A pump 7 is interposed in the line 6 to force raw oil through the coil 2, and the pipe 4 into the top of the separating tower. If the catalyst is in a liquid form, it is charged to the separating tower through a pipe 8, directly below the raw oil charging pipe. A vapor line 9, for conducting vapors and gases from the tower, extends from the top of the tower to a condenser 10, which in turn communicates with a receiver 11. The condensate, from the vapors condensing in condenser 10, is collected in the receiver, which is equipped with the usual liquid draw-off pipe 12 and gas release pipe 13.

The separating tower is preferably packed with baffling material 14 to provide intimate contact of the catalyst with the oil and to allow free escape of gases and vapors. This baffling material is supported on a tray 15, a short distance from the bottom of the tower. A body of liquid collects immediately below the tray and immersed in this liquid is a nozzle 16, connected to a gas line 17, so that a gas may be blown through the liquid and up the tower to sweep out vapors and gases. The liquid level is maintained constant by a float valve 18, which automatically controls the release of liquid through the pipe 19. A pump 20, interposed in the pipe 19, then pumps the liquid mixture of catalyst and hydrocarbon oil to a conversion apparatus 21, which is merely a diagrammatic representation of any suitable type of apparatus for converting high boiling point oils into low boiling point oils. As the conversion apparatus is usually kept under high pressure, a valve 22, which may be of the back-pressure type, is shown in the pipe 19 to adjust the pressure between the tower 1 and the conversion apparatus.

The tower 1 and the baffling material 14 are made of material resistant to the corrosive substances evolved by the particular catalyst which is used. Attempt will not be made to specify the materials suitable for this purpose but the invention contemplates the adaption of any appropriate material to the conditions which may arise in practice. In case the catalyst is aluminum chloride, as previously mentioned, the structure would preferably consist of material resistant to hydrochloric acid, such as stoneware, quartz or iron-chromium alloy. It may be desirable, in some instances, not to make the entire structure of non-corrosive material, in which event, the interior of the tower might be lined or coated with a suitable substance.

It is to be understood that the apparatus shown in the drawing is merely for purposes of illustration and that other modifications may be used. For example, other means of heating the oil might be employed, such as a steam preheater or heat might well be applied directly to the tower 1. Also, the respective means and positions of introducing the oil and catalyst may be varied without departing from the spirit of the invention.

In practicing the invention with a type of apparatus such as the one shown in the drawing, a comparatively high boiling hydrocarbon, which may be of the nature of gas-oil, is drawn from a suitable source of supply by the pump 7 and forced through the coil 2 and into the top of the separating tower 1. While passing through the coil 2, the oil is brought to a temperature substantially below the temperature at which material conversion of the oil takes place, in the presence of the catalyst, for example, 200–500° F. The hot oil is preferably introduced near the top of the separating tower to insure adequate time for reaction with the catalyst and to permit release of vapors as the materials intimately mix and pass down over the baffling material. A suitable catalyst is introduced through the pipe 8. If aluminum chloride is used as the catalyst, it is preferably charged in the form of a liquid hydrocarbon compound formed by contacting aluminum chloride and oil vapors, as described in United States patent to Frank W. Hall, No. 1,647,445, of November 1, 1927.

The temperature in the separating tower is maintained preferably at a point where the corrosive materials are quickly and completely liberated from the catalyst. This temperature, of course, will vary with the type of catalyst and may in some instances be quite low while in other cases it may be at the point of incipient cracking of the oil. In general, however, 200-300° F. is sufficient to accomplish the desired results. This temperature is so low that no substantial amount of conversion is found to take place, and furthermore, it is within a range which permits the selection of relatively fragile apparatus to resist the corrosion.

As the oil and catalyst are intimately mixed in the tower, evolution of corrosive materials occurs. This is often in the form of acid fumes or vapors which may be conveniently released at the top of the tower through line 9. To aid in the release of the fumes and sweep them out of the tower, a gas such as natural gas, carbon dioxide, hydrogen or other inert gas is introduced by the pipe 17 and blown through the nozzle 16, thereby bubbling up through the body of liquid at the base of the tower and sweeping around the baffling material 14 as it goes up the tower in a reverse direction to the flow of the liquid. A relatively slight amount of conversion of the oil may take place in the tower 1, and the lower boiling oil vapors evolved are condensed and collected in the receiver 11.

The liquid at the bottom of the separating tower, as a result of the scrubbing action of the gas introduced through pipe 17 and the elevated temperature maintained in the tower, is substantially free from corrosive substances. A low pressure, of approximately atmospheric or slightly above, is maintained in the tower 1, and this also aids in the complete evolution of gases and vapors. The liquid is drawn through line 19 by the pump 20 and forced into the conversion or hydrogenating apparatus. The quantity of oil and catalyst pumped through the line 19 into the conversion apparatus is usually small in comparison to the liquid undergoing conversion in the zone 21; however, if desirable, all the oil to be converted or otherwise treated may be charged through this line along with the catalyst. In the latter case, the oil would require further heating to maintain a sufficient temperature in the conversion zone. The method of charging and heating the additional oil in the conversion zone 21 is not shown, since this zone represents diagrammatically any suitable type of conversion apparatus and constitutes no part of the present invention.

It is to be understood that I do not wish to limit the invention to the particular details, parts and feaures disclosed. For example, my process may be used in connection with catalysts other than aluminum chloride, such as salts of other metals, especially anhydrous chlorides of iron and zinc or any catalysts which liberate corrosive substances when first introduced into hydrocarbon oils. It will therefore be obvious that many changes and modifications are possible and are desired to be covered as far as possible within a fair and proper interpretation of the appended claims.

I claim:

1. The method of treating a catalyst of the aluminum chloride type, which normally tends to liberate corrosive substances, such as hydrogen chloride, when contacted with hydrocarbon oil in a conversion operation wherein high boiling hydrocarbon oils are converted into low boiling oils, comprising the steps of preheating a hydrocarbon oil to a temperature below that at which any substantial conversion of the oil occurs when contacted with the catalyst but sufficiently high to effect release of the corrosive substances from the catalyst, charging the preheated oil downwardly through an elongated vertical passageway, introducing aluminum chloride into said passageway thereby causing it to mix with the preheated oil and to liberate the corrosive substances which separate from the mixture of oil and catalyst and rise as gases and vapors to the upper portion of the passageway, and separately withdrawing from the upper portion of the passageway said corrosive substances and from the bottom thereof the mixture of oil and catalyst.

2. The method of treating aluminum chloride catalyst, which normally tends to liberate corrosive fumes of the nature of hydrogen chloride when subjected to heat in the presence of hydrocarbon oils, to condition the same for use as a catalyst in the conversion of hydrocarbons, which comprises the steps of preheating a hydrocarbon oil to about 200°–300° F., charging the preheated oil downwardly in an obstructed path through a space confined by materials substantially resistant to corrosion by said corrosive fumes, contacting the oil in the downward movement with aluminum chloride catalyst thereby liberating the corrosive fumes from the catalyst and causing the same to separate from the oil and catalyst and to rise to the upper portion of said space, and separately withdrawing the corrosive fumes from the upper portion of said space and the mixture of oil and catalyst from the bottom thereof.

WILLIAM MALCOLM STRATFORD.